United States Patent [19]

Bjornlie

[11] Patent Number: 4,773,724
[45] Date of Patent: Sep. 27, 1988

[54] PACKAGING FOR FIBER OPTIC DEVICES

[75] Inventor: Harvey C. Bjornlie, Pacific Palisades, Calif.

[73] Assignee: McDonnell Douglas Corporation, Long Beach, Calif.

[21] Appl. No.: 37,460

[22] Filed: Apr. 13, 1987

[51] Int. Cl.⁴ ................................................ G02B 6/36
[52] U.S. Cl. ............................... 350/96.20; 350/96.23
[58] Field of Search ............... 350/96.20, 96.21, 96.22, 350/96.23

[56] References Cited

U.S. PATENT DOCUMENTS

| | | | |
|---|---|---|---|
| 4,444,461 | 4/1984 | Wey et al. | 350/96.21 |
| 4,445,753 | 5/1984 | Collignon | 350/96.21 |
| 4,544,234 | 10/1985 | DeVeau, Jr. et al. | 350/96.21 |
| 4,647,150 | 3/1987 | DeSanti et al. | 350/96.21 |
| 4,687,290 | 8/1987 | Prussas | 350/96.20 |

FOREIGN PATENT DOCUMENTS

| | | | |
|---|---|---|---|
| 1185469 | 4/1985 | Canada | 350/96.21 |
| 2814090 | 10/1978 | Fed. Rep. of Germany | 350/96.21 |
| 9453 | 1/1977 | Japan | 350/96.21 |
| 30448 | 3/1977 | Japan | 350/96.21 |
| 42738 | 4/1977 | Japan | 350/96.21 |
| 55650 | 5/1977 | Japan | 350/96.21 |
| 17746 | 2/1978 | Japan | 350/96.21 |
| 11753 | 1/1979 | Japan | 350/96.21 |
| 108611 | 8/1980 | Japan | 350/96.21 |

*Primary Examiner*—William L. Sikes
*Assistant Examiner*—Frank González
*Attorney, Agent, or Firm*—Benjamin Hudson, Jr.; George W. Finch; John P. Scholl

[57] ABSTRACT

There is provided by this invention packaging for fiber optic devices that utilizes two concentric cylinders such that one end of the inner cylinder is rigidly fixed to the outer cylinder, while the other end is flexibly attached to the outer cylinder. This attachment isolates the inner tube which supports the fiber optic device from the axial compressive strain subjected to the outer tube. An overall flexible sealing material is applied to seal the device.

4 Claims, 1 Drawing Sheet

PACKAGING FOR FIBER OPTIC DEVICES

BACKGROUND OF THE INVENTION

This invention is related generally to packaging for fiber optic devices such as couplers, sensors, splices, etc., and more particularly to fiber optic packaging having pressure and strain relief configurations for high temperature and pressure environments.

DESCRIPTION OF THE PRIOR ART

In applications where the temperature and pressure of the environment vary widely, the forces resulting from these changes must be absorbed by the fiber optic package, without affecting the device itself. This combination of environments is encountered in both military and commercial marine use, where a device may be subject to a wide range of temperatures while stowed on the deck of a ship, and to high pressures when deployed to great depths in the ocean. Currently available fiber optic devices, such as couplers, are not capable of sustaining high fluid pressures.

SUMMARY OF THE INVENTION

There is provided by this invention a packaging method that will permit a fiber optic device to operate at both high pressures and widely varying temperatures, in an extremely compact package; as small as 3 mm in diameter and 30 mm in length. The package is comprised of two close fitting concentric tubes. The inner tube supports each end of the fiber optic device by means of a small plug of high temperature thermally conductive, structural adhesive. The tube provides good structural support and has the same thermal expansion rate as the fiber. This feature provides a strain free mount for the device over a wide temperature range. The outer tube and its end plugs act as a protective pressure vessel.

BRIEF DESCRIPTION OF THE PREFERRED EMBODIMENT

Figure 1:
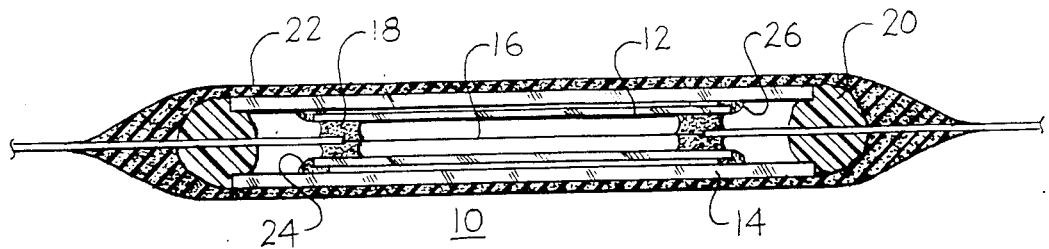
FIG. 1 is a sectional view of a fiber optic package incorporating the principles of this invention.

There is shown in FIG. 1 a fiber optic package 10 configured to protect a fiber optic coupler or other fiber optic device. The package is comprised generally of two close fitting concentric tubes 12 and 14. The inner tube 12 supports each end of the fiber optic device 16 by means of a high temperature, thermally conductive, structural adhesive 18 that also supports the jacketed ends of the optical fibers connected to the device. The adhesive 18 may be an epoxy. The tube 12 is generally made of the same material as the fiber optic device, usually fused silica or other suitable material. This provides good structural support and has the same thermal expansion rate as the fiber optic device. The outer tube 14 and its end plugs 20 act as a device, usually protective pressure vessel. The outer pressure may be fused silica also, although other materials may be used in extreme environments. The end plugs 20 may again be comprised of a potting type thermally conductive structural adhesive such as epoxy. A soft sealant material is applied to the fibers as they exit the end plugs to create a strain relief. This material 22 is also applied to the outside of the assembly to form a flexible seal and may generally consist of a polyurethane molding compound. Other flexible sealing compounds may be used to form a flexible seal such as polysulfide, silicone, etc.

The inner tube 12 is structurally bonded to the outer tube 14 at one end only. A rigid bond is made at 24 with a hard epoxy compound or equivalent. The other end is bonded to the outer tube with a soft resilient silicone adhesive or equivalent at 26 for a flexible connection. This structural attachment isolates the inner tube 12 from the axial compressive strain of the outer tube 14 when the package is subjected to an external pressure. Thus, the sensitive portion of the device is fully protected from the fluid pressure and only the fiber leads between the two tubes at the free end are subject to compression loading. This portion of the fiber is relatively insensitive to the anticipated strain levels. The significance of this feature is that immersed in a fluid at 2500 psi, the compressive deflection of the typical outer tube 14 of 3 mm outside diameter, 2 mm inside diameter, and 20 mm long is 20 micrometers. However, the structural design hereinbefore described isolates the inner tube from this deflection. The performance of most devices are seriously affected by such a deflection.

Figure 2:
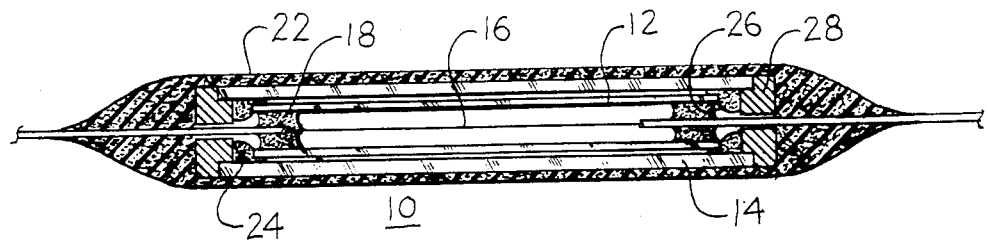
FIG. 2 is a sectional view of an alternate environment incorporating the principles of this invention.

FIG. 2 illustrates an alternate embodiment of the device shown in FIG. 1. In this packaging method the potting-type end plugs at 20 are replaced by fabricated ferrules such as 28. The other structural elements are the same as described in FIG. 1.

Although there has been illustrated and described specific detail and structure of operation, it is clearly understood the same were merely for purposes of illustration and that changes and modifications may be readily made therein by those skilled in the art without departing from the spirit and the scope of this invention.

What I claim:

1. A package assembly for fiber optic devices, comprising:
   (a) an inner tubular means for supporting a fiber optic device;
   (b) an outer tubular means for enclosing the inner tubular means having one end of the inner tubular means rigidly connected thereto and the other end flexibly connected to the outer tubular means;
   (c) a high temperature thermally conductive sealing means for sealing the ends of the inner tubular means;
   (d) a high temperature thermally conductive sealing means for sealing the ends of the outer tubular means; and
   (e) a flexible sealing means for enclosing the outer tubular means.

2. A package assembly for fiber optic devices as recited in claim 1 wherein the inner tubular means is generally comprised of the same material as the fiber optic device.

3. A package assembly for fiber optic devices as recited in claim 1 wherein the high temperature thermally conductive sealing means is generally comprised of epoxy.

4. A package assembly for fiber optic devices as recited in claim 1 wherein the ends of the outer tubular means are sealed with a ferrule.

* * * * *